United States Patent [19]
Tanaka et al.

[11] Patent Number: 5,183,637
[45] Date of Patent: Feb. 2, 1993

[54] WEAR RESISTANT COPPER ALLOYS

[75] Inventors: Tadashi Tanaka, Konan; Masaaki Sakamoto, Nagoya; Koichi Yamamoto, Komaki; Tohru Kato, Seto, all of Japan

[73] Assignee: Daido Metal Company Ltd., Nagoya, Japan

[21] Appl. No.: 832,124

[22] Filed: Feb. 6, 1992

[30] Foreign Application Priority Data

Feb. 7, 1991 [JP] Japan .................... 3-016539

[51] Int. Cl.$^5$ .......................... C22C 30/00; C22C 5/06
[52] U.S. Cl. ................................. 420/479; 420/480
[58] Field of Search ........................ 420/479, 480

[56] References Cited
FOREIGN PATENT DOCUMENTS

| 1558468 | 7/1970 | Fed. Rep. of Germany ...... 420/479 |
| 53-44135 | 11/1978 | Japan . |
| 56-11735 | 3/1981 | Japan . |
| 57-39148 | 3/1982 | Japan .................... 420/479 |
| 61-133357 | 6/1986 | Japan .................... 420/480 |
| 2240785 | 8/1991 | United Kingdom . |

Primary Examiner—Deborah Yee
Attorney, Agent, or Firm—Browdy and Neimark

[57] ABSTRACT

A wear-resistant copper alloy containing 1.2 to 8.5% Mn, 0.3 to 2.5% Si, 3.0 to 8.0% Al, 20 to 40% Zn, 0.05% to 1.5% Te, and the balance of Cu and unavoidable impurities. The alloy includes other variations based on by adding (1) 0.5 to 3% Ni, (2) 0.5 to 13% Pb, (3) 0.5 to 3% Ni and 0.5 to 13% Pb or (4) 0.5 to 13% Pb and 0.02 to 1.5% Mg. Lead provides the self-lubricating property to the alloy. Magnesium disperses lead finely and uniformly in the alloy.

6 Claims, 7 Drawing Sheets

CORROSION TEST

| KIND OF ALLOY | SPECIMEN NO. | CORROSION LOSS (mg/cm²) |
|---|---|---|
| INVENTION ALLOY | 1 | ▬ |
| | 2 | ▬ |
| | 3 | ▬ |
| | 4 | ▬ |
| | 5 | ▬ |
| | 6 | ▬▬ |
| | 7 | ▬▬ |
| | 8 | ▬▬ |
| | 9 | ▬▬ |
| | 10 | ▬▬ |
| CONVENTIONAL ALLOY | 11 | ▬▬▬▬▬▬▬▬▬▬▬▬▬▬ |
| | 12 | ▬▬▬▬▬▬▬▬▬▬ |
| | 13 | ▬▬ |
| | 14 | ▬▬ |
| | 15 | ▬▬ |

FIG. 4

THE FIRST FATIGUE TEST

| KIND OF ALLOY | SPECIMEN NO. | TESTING LOAD (kgf/mm²) 10  20  30  40 |
|---|---|---|
| INVENTION ALLOY | 1 | ▬▬▬▬▬▬▬▬ |
| | 2 | ▬▬▬▬▬▬▬▬ |
| | 3 | ▬▬▬▬▬▬▬▬▒ |
| | 4 | ▬▬▬▬▬▬▬▬ |
| | 5 | ▬▬▬▬▬▬▬▬ |
| | 6 | ▬▬▬▬▬▬▬▬ |
| | 7 | ▬▬▬▬▬▬▬▒ |
| | 8 | ▬▬▬▬▬▬▬▬ |
| | 9 | ▬▬▬▬▬▬▬▒ |
| | 10 | ▬▬▬▬▬▬▬ |
| CONVENTIONAL ALLOY | 11 | ▬▒ |
| | 12 | ▬▬▬▬▬▒ |
| | 13 | ▬▬▬▬▒ |
| | 14 | ▬▬▬ |
| | 15 | ▬▬▬▬ |

∗ HATCHED PORTION AT THE END OF EACH BAR INDICATES A VARIATION IN THE RESULTS OF TWO TEST CYCLES

FIG. 6

SEIZURE TEST

| KIND OF ALLOY | SPECIMEN NO. | MAXIMUM SPECIFIC LOAD WITHOUT SEIZURE (kgf/cm²) 50  100  150 |
|---|---|---|
| INVENTION ALLOY | 1 | ≥150 |
| | 2 | ≥150 |
| | 3 | ≥150 |
| | 4 | ≥150 |
| | 5 | ≥150 |
| | 6 | ≥150 |
| | 7 | ≥150 |
| | 8 | ≥150 |
| | 9 | ≥150 |
| | 10 | ≥150 |
| CONVENTIONAL ALLOY | 11 | ≥150 |
| | 12 | ~50 / ~90 |
| | 13 | ~45 / ~70 |
| | 14 | ~75 |
| | 15 | ≥150 |
| CONV. | 14 | ~70 |
| | 15 | ≥150 |

FIG. 8

CORROSION TEST

| KIND OF ALLOY | SPECIMEN NO. | CORROSION LOSS (mg/cm²) |
|---|---|---|
| INVENTION ALLOY | 1 | ▬ |
| | 2 | ▬ |
| | 3 | ▬ |
| | 4 | ▬ |
| | 5 | ▬ |
| | 6 | ▬▬ |
| | 7 | ▬▬ |
| | 8 | ▬▬ |
| | 9 | ▬ |
| | 10 | ▬▬ |
| CONVENTIONAL ALLOY | 11 | ▬▬▬▬▬▬▬▬▬▬▬▬ (~0.40) |
| | 12 | ▬▬▬▬▬▬▬▬▬ (~0.30) |
| | 13 | ▬▬ |
| | 14 | ▬▬ |
| | 15 | ▬▬ |

# WEAR RESISTANT COPPER ALLOYS

BACKGROUND OF THE INVENTION

This invention relates to high-strength, wear-resistant copper alloys and, more particularly, to high-strength, wear-resistant copper alloys having improved properties and suitable for use as a part material of a machine used under a severe sliding condition, for example, a sliding material for a sliding part, such as a rocker arm pin or a piston bush used in a valve moving mechanism of an internal combustion engine.

Conventionally, lead bronze alloys (JIS H5115) is used as a sliding material for the low or middle level load, and phosphor bronze alloys, free-cutting phosphor bronze alloys (JIS H3270), high strength brass alloys, aluminum bronze alloys, low-friction, high-strength brass alloys disclosed in the preceding applications of the present inventors (JP-B-53-44135 and JP-B-56-11735) and other alloys are known as high-load sliding materials.

However, such conventional alloys are practically unsatisfactory with respect to the wear resistance property or the anti-seizure property under a severe sliding condition, e.g., a high-speed, high-load condition, and a sliding material further improved in performance is now expected.

In recent days, needs for improvements in the engine performance, e.g., high power, high speed and high load and a reduction in fuel consumption have markedly been increased. Also, the conditions under which sliding materials for bearings and the like are used have become more severe.

Conventionally, alloys such as phosphor bronze alloys, high strength brass alloys and aluminum bronze alloys have widely been used as materials having the high wear resistance property. Phosphor bronze alloys, however, are inferior in the strength and the seizure properties under a high-speed, high-load sliding condition. Aluminum bronze alloys are generally satisfactory in strength but are inferior in the wear resistance and seizure properties. High strength brass alloys also recommended as a wear resistant material are inferior in each of the strength, the seizure property and the wear resistance properties.

As mentioned above, the conditions of use are becoming more severe and presently there is no material satisfactory in terms of the strength, the wear resistance property and so on under a high-speed, high-load condition. This is a serious problem in this technical field and there is therefore a need to develop a sliding material having the high toughness and the good wear resistance property.

SUMMARY OF THE INVENTION

In view of these circumstances, a primary object of the present invention is to provide novel high-strength, wear-resistant copper alloys excellent in the wear resistance property, the anti-seizure property, the corrosion resistance property, and the load-resisting properties.

In general, bronze system alloys have the excellent wear resistance property as stated above. However, under a high-speed, high-load condition, aluminum bronze alloys have problems in the wear resistance and the seizure property. Further, it is difficult to suppress the blackening corrosion of bronze system alloys during operation with a lubricant at a high temperature. For this reason, according to the invention, brass alloys having the high corrosion resistance property is adopted and the strength and the toughness of the matrix are increased by addition of alloying elements. Also, specific elements are added in order to improve the anti-seizure property. Further, an intermetallic compound or lead particles are dispersed in the matrix in order to improve the anti-seizure property and the wear resistance property.

Under the object mentioned above, according to the invention, there are provided wear resistant alloys described below.

The following is a basic form of the alloy in accordance with the invention:

A wear-resistant copper alloy comprising, by weight, 1.2 to 8.5% Mn, 0.3 to 2.5% Si, 3.0 to 8.0% Al, 20 to 40% Zn, 0.05 to 1.5% Te and the balance of Cu and unavoidable impurities. This alloy has an improved anti-seizure property by containing Te and has high strength and high toughness. The alloy may contain one or more of Ni, Pb and Mg in accordance with the followings:

a. a wear-resistant copper alloy comprising, by weight, 1.2 to 8.5% Mn, 0.3 to 2.5% Si, 3.0 to 8.0% Al, 0.5 to 3% Ni, 20 to 40% Zn, 0.05 to 1.5% Te and the balance of Cu and unavoidable impurities, which has an improved anti-seizure property, high strength and high toughness;

b. a wear-resistant copper alloy comprising, by weight, 1.2 to 8.5% Mn, 0.3 to 2.5% Si, 3.0 to 8.0% Al, 20 to 40% Zn, 0.05 to 1.5% Te, 0.5 to 13% Pb and the balance of Cu and unavoidable impurities, which has the self-lubricating property due to containing Pb and has a further improved anti-seizure property, high strength and high toughness;

c. a wear-resistant copper alloy comprising, by weight, 1.2 to 8.5% Mn, 0.3to 2.5% Si, 3.0 to 8.0% Al, 0.5to 3% Ni, 20 to 40% Zn, 0.05 to 1.5% Te, 0.5 to 13% Pb and the balance of cu and unavoidable impurities, which has a self-lubricating property due to containing Pb and has a further improved anti-seizure property, high strength and high toughness;

d. a wear-resistant copper alloy comprising, by weight, 1.2 to 8.5% Mn, 0.3 to 2.5% Si, 3.0 to 8.0% Al, 20 to 40% Zn, 0.05 to 1.5% Te, 0.5 to 13% Pb, 0.02 to 1.5% Mg and the balance of Cu and avoidable impurities, in which Pb is dispersed finely and uniformly due to containing Mg, and which has high strength and high toughness; and e. a wear-resistant copper alloy containing, by weight, 1.2 to 8.5% Mn, 0.3 to 2.5% Si, 3.0 to 8.0% Al, 0.5 to 3% Ni, 20 to 40% Zn, 0.05 to 1.5% Te, 0.5 to 13% Pb, 0.02 to 1.5% Mg and the balance of Cu and unavoidable impurities, in which Pb is dispersed finely and uniformly due to containing of Mg, and which has high strength and high toughness.

Other features of the present invention will become apparent from the following description of the invention.

BRIEF DESCRIPTION OF THE DRAWINGS

FIG. 4 is a bar graph showing results of the first fatigue test on the invention alloy and conventional alloys;

FIG. 6 is a bar graph showing results of a seizure test;

FIG. 8 is a bar graph showing results of a corrosion test.

DETAILED DESCRIPTION OF THE INVENTION

Figure 1:
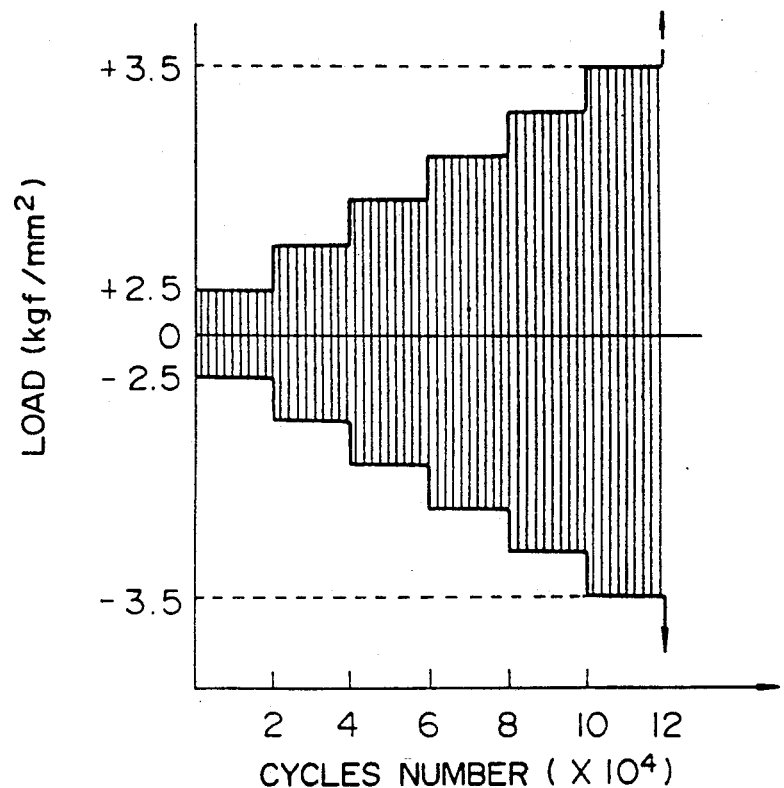
FIG. 1 is a diagram showing a test load pattern in a first fatigue test conditions shown in Table 3.

The reason of the amount limitation of each component of the invention alloy as set forth in the claims and the effects of derived from each component will be described below.

A. Zn (20 to 40% by weight):

Zinc gives a strength, wear resistance and corrosion resistance against a lubricant oil to the alloy. Alloys having the alpha and beta phases or the beta-phase structure have the friction properties superior than those of alloys having the beta-phase structure. However, if the gamma-phase is generated, the alloy becomes brittle. An upper limit of zinc is thereby determined. The amount of zinc to be added varies according to equivalents of other alloying elements to zinc and amounts of such alloying elements. According to some experiments made in a practical view point, generally 20 to 40% of zinc is added.

B. Mn (1.2 to 8.5% by weight), Si (0.3 to 2.5% by weight):

Manganese and silicon form an intermetallic compound of $Mn_5Si_3$ having excellent sliding properties and thereby contribute to improvements in the wear resistance and the anti-seizure properties. They also inhibit the matrix from moving to flow at the time of occurrence of a metal-to-metal contact. The contents of manganese and silicon are determined by the composition proportions in the $Mn_5Si_3$ compound. When the Mn/Si ratio is 1/0.3, all the elements form the compound. Accordingly, at least 1.2% of Mn and at least 0.3% of Si are required. If 11% or more of $Mn_5Si_3$ exists, the ductility of the alloy is seriously impaired and the alloy becomes brittle. When the content of $Mn_5Si_3$ is 11%, the contents of Mn and Si are 8.5 and 2.5%, respectively. These values are therefore set as upper limits.

Thus, the contents of Mn and Si are freely selected within the range of 1.2 to 8.5% and the range of 0.3 to 2.5%, respectively. An amount of free manganese or silicon which does not form $Mn_5Si_3$ may remain, resulting in the followings. If free manganese exists, the toughness of the alloy is improved. If free silicon exists, the wear resistance of the alloy is improved. However, it is undesirable to set an excessively large amount of free silicon because such an amount of silicon promotes the growth of the brittle gamma-phase since the silicon equivalent to zinc is large, i.e., 10.

C. Al (3.0 to 8.0 weight %):

Aluminum is effective in strengthening the matrix. It, also, is a large equivalent to zinc like silicon and promotes the gamma phase growth. If the content of aluminum is smaller than 3.0%, a hardness necessary for the desired wear resistance cannot be obtained. If an amount of aluminum larger than 8% is added, bad effects, embrittlement of the alloy and coarsening of crystal grains, are caused. The aluminum content is therefore set to 3.0 to 8.0%.

D. Te (0.05 to 1.5% by weight):

Even if a small amount of tellurium is contained, in the alloy, lead is dispersed uniformly, and the anti-seizure property and the toughness can be improved. Addition of tellurium is also effective in improving the corrosion resistance property. If the amount of tellurium is smaller than 0.05%, such effects cannot be expected. Addition of an amount of tellurium larger than 1.5% is disadvantageous because the production cost is increased while further technical effects are not obtained. The amount of tellurium is therefore set to 0.05 to 1.5.

E. Pb (0.5 to 13% by weight):

Lead has a self-lubricating effect. Lead in the alloy melts by frictional heat and moves to flow on the sliding surface to form a thin film having a thickness of several microns, when the alloy is brought into sliding contact with a mating member. Therefore, lead enables a remarkable improvement in the anti-seizure property and the machinability. If the amount of lead is less than 0.5%, the improvement in the anti-seizure property is small. If it exceeds 13%, disadvantages including segregation of lead and coarsening of lead grains take place, resulting in a reduction in the strength of the alloy. An upper limit of 13% is therefore set. Thus, the amount of lead is set to 0.5 to 13% by weight.

F. Mg (0.02 to 1.5% by weight):

Magnesium is effective in uniformly dispersing lead and strengthening the matrix. If the amount of magnesium is less than 0.02%, the effects are small. If it is excessively large, an excessively large amount of an intermetallic compound of magnesium and lead is formed and the self-lubricating effect of lead is thereby impaired. The amount of magnesium to be contained is therefore set to 0.02 to 1.5%.

G. Ni (0.5 to 3.0% by weight):

Nickel strengthens the matrix, and increases the strength and the wear resistance of the alloy. It also makes the recrystallization temperature to raise and is effective in limiting crystal grain coarsening during hot plastic working. If the amount of nickel is less than 0.5, such effect cannot be exhibited and, if it exceeds 3.0%, the fatigue strength and the impact resistance of the alloy are seriously impaired. The amount of nickel is therefore set to 0.5 to 3.0%.

EXPERIMENT a. The invention alloy

Examples of the invention alloy having compositions of Specimens number 1 to 10 shown in Table 1 were melted, cast by continuous casting and extruded to form rods having a diameter of 35 mm. The rods thereby formed were machined to obtain test pieces for a tensile strength testing, a fatigue testing, a seizure testing, a wear testing and a corrosion testing.

b. Conventional alloy

Figure 5:
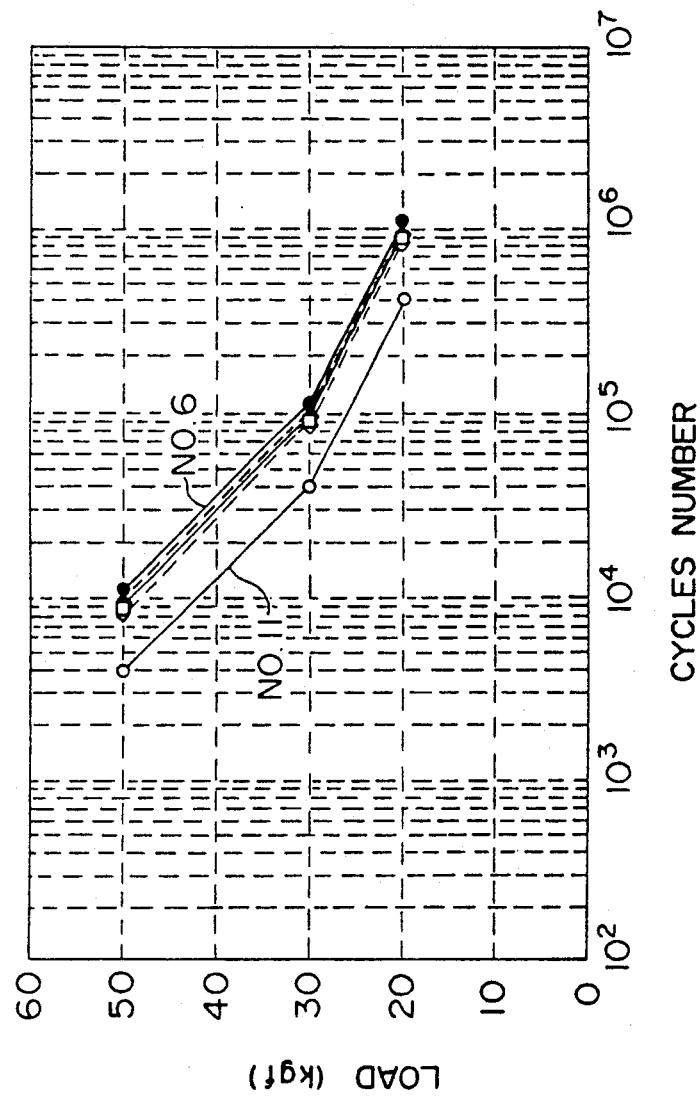
FIG. 5 is a graph showing results of the second fatigue test on the invention alloys and the conventional alloys in terms of "load-cycle numbers" relationship.
Figure 7:
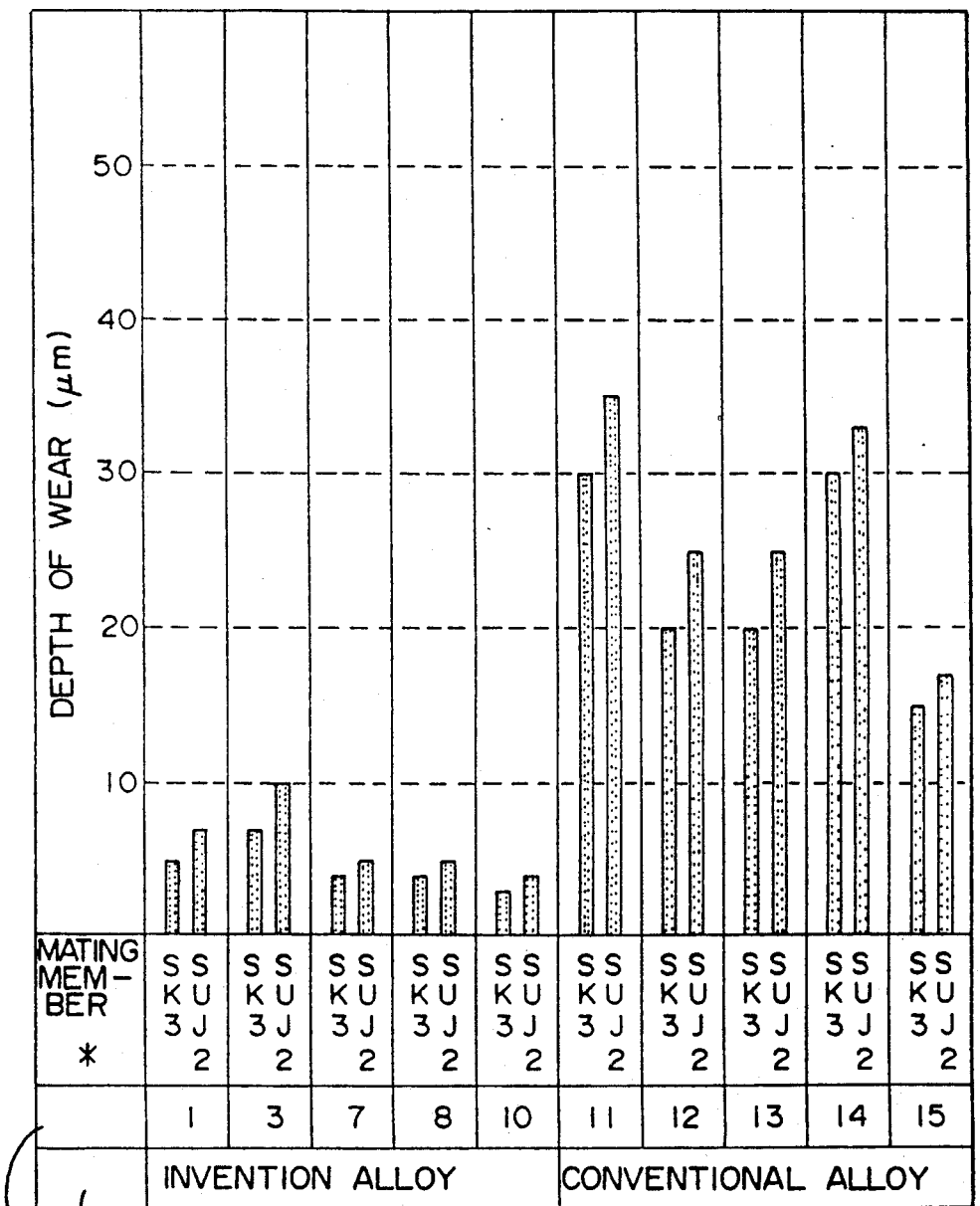
FIG. 7 is a bar graph showing results of a wear test.

Materials of Specimen number 11 to 14 on the market shown in Table 1 and the material of Specimen number 15 of the alloy in accordance with the preceding Japanese patent application were melted, cast by continuous casting and extruded to form rods having a diameter of 35 mm. The rods thereby formed were machined to obtain pieces for the same testings as in the case of the invention alloys.

c The copper alloys shown in Table 1 were subjected to the tensile testing, the fatigue testing, the seizure testing, the wear testing and the corrosion testing conducted under various testing conditions shown in Tables 3 to 7. Table 2 shows results of the tensile testing and the hardness testing. FIGS. 4-5, and 6 show results of the first and the second fatigue testings, and the seizure testing, respectively. FIG. 7 shows typical results of the wear testing and FIG. 8 shows results of the corrosion testing.

Specimens 1 to 10 are alloys of the present invention as aforementioned. Specimen 11 is lead bronze alloy-1, specimen 12 phosphor bronze alloy-2, specimen 13 high strength brass alloy-2, specimen 14 aluminum bronze alloy-2, and specimen 15 the alloy in accordance with the preceding application.

In this experiment, the specimens formed by a continuous casting method were used. However, substantially the same results can be obtained by using a testing piece produced by a stationary casting method. Other kinds of casting method may be also adopted in the same experiment.

TABLE 1

| Kind of alloy | Specimen No. | Cu | Zn | Mn | Si | Al | Pb | Te | Mg | Ni | Fe | Sn | P |
|---|---|---|---|---|---|---|---|---|---|---|---|---|---|
| Invention Alloy | 1 | 59.0 | 33.8 | 3.0 | 1.2 | 3.0 | — | 0.3 | — | — | — | — | — |
|  | 2 | 58.0 | 33.8 | 2.5 | 1.0 | 3.5 | — | 1.2 | — | — | — | — | — |
|  | 3 | 56.0 | 34.0 | 2.5 | 1.0 | 6.0 | — | 0.5 | — | — | — | — | — |
|  | 4 | 58.0 | 33.9 | 2.5 | 1.0 | 3.5 | — | 0.3 | — | 0.8 | — | — | — |
|  | 5 | 57.0 | 34.2 | 2.5 | 1.0 | 3.0 | — | 0.3 | — | 2.0 | — | — | — |
|  | 6 | 56.0 | 33.3 | 3.0 | 1.2 | 3.2 | 3.0 | 0.3 | — | — | — | — | — |
|  | 7 | 52.0 | 30.3 | 3.0 | 1.2 | 3.2 | 10.0 | 0.3 | — | — | — | — | — |
|  | 8 | 54.0 | 34.0 | 3.5 | 1.5 | 3.2 | 3.0 | 0.3 | 0.5 | — | — | — | — |
|  | 9 | 53.0 | 30.0 | 2.5 | 1.0 | 3.2 | 10.0 | 0.3 | 1.5 | — | — | — | — |
|  | 10 | 53.0 | 30.0 | 2.5 | 1.0 | 4.0 | 7.0 | 0.5 | 1.0 | 1.0 | — | — | — |
| Conventional Alloy | 11 | 77.0 | — | — | — | — | 15.0 | — | — | — | — | 8.0 | — |
|  | 12 | 93.8 | — | — | — | — | — | — | — | — | — | 6.0 | 0.2 |
|  | 13 | 58.0 | 39.0 | 1.5 | — | 1.0 | — | — | — | — | 0.5 | — | — |
|  | 14 | 84.0 | — | 1.3 | — | 9.5 | — | — | — | 1.3 | 4.0 | — | — |
|  | 15 | 59.0 | 32.8 | 2.5 | 1.0 | 2.0 | 2.5 | 0.2 | — | — | — | — | — |

TABLE 2

| Kind of alloy | Specimen No | Tensile strength Kgf/mm² | Hardness Hv10 |
|---|---|---|---|
| Invention Alloy | 1 | 82.0 | 225 |
|  | 2 | 84.0 | 240 |
|  | 3 | 90.5 | 260 |
|  | 4 | 85.0 | 230 |
|  | 5 | 87.5 | 245 |
|  | 6 | 81.0 | 222 |
|  | 7 | 76.0 | 210 |
|  | 8 | 82.0 | 225 |
|  | 9 | 78.5 | 215 |
|  | 10 | 81.0 | 225 |
| Conventional Alloy | 11 | 28.5 | 104 |
|  | 12 | 72.5 | 190 |
|  | 13 | 60.0 | 155 |
|  | 14 | 70.0 | 220 |
|  | 15 | 65.0 | 160 |

TABLE 3

Condition of Fatigue Test

Figure 2:
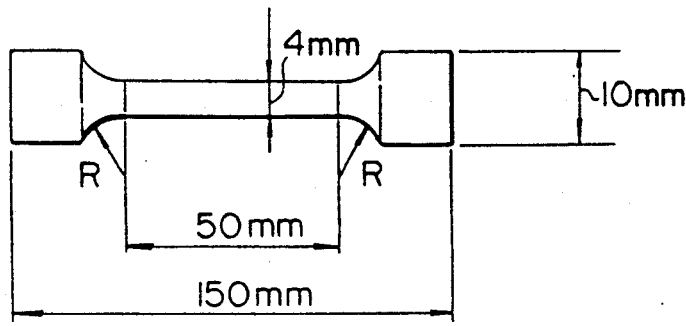
FIG. 2 shows a test piece of a circular rod tested under the first and the second fatigue test conditions shown in Tables 3 and 4.
Figure 3:
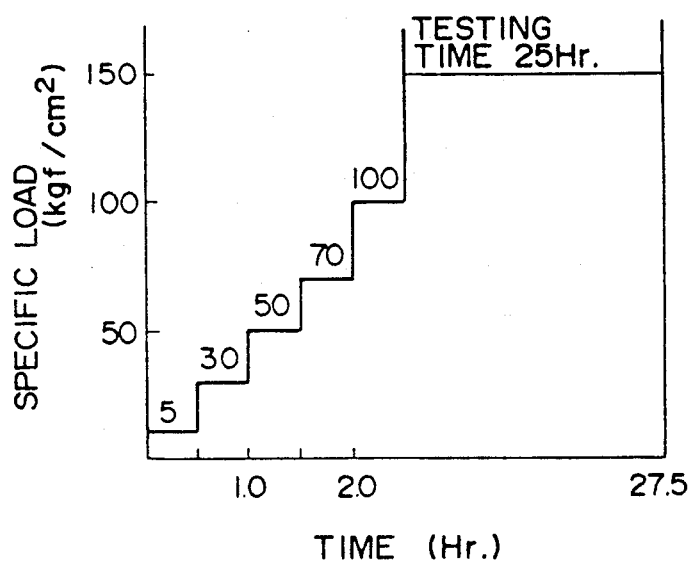
FIG. 3 is a graph of a pressure applying schedule in the seizure test conditions shown in Table 5.

| Item |  |
|---|---|
| 1. Testing machine | Fatigue testing machine |
| 2. Test piece | See FIG. 2 |
| 3. Cycles number | 30 (Hz) |
| 4. Test waveform | Sine wave |
| 5. Test Temperature | Room Temp. (°C.) |
| 6. Test load pattern | FIG. 1 |

Evaluation Method: Evaluating from the load at which rupture occurs.

TABLE 4

Condition of Fatigue Test

| Item |  |
|---|---|
| 1. Testing machine | Fatigue testing machine |
| 2. Test piece | See FIG. 2 |
| 3. Cycles number | 16.7 (Hz) |
| 4. Test waveform | Sine wave |
| 5. Test Temperature | Room Temp. (°C.) |
| 6. Specific load | ±20, ±30, ±50 (Kgf) |

Evaluation Method: Evaluating from the load at which rupture occurs.

TABLE 5

Condition of Seizure Test

| Item |  | Unit |
|---|---|---|
| Bush size | 28 × 20 × 120 | mm |
| Outer dia. | 28 | mm |
| Inner dia. | 20 | mm |
| Length | 120 | mm |
| Number of Rotation | 1910 | rpm |
| Velocity | 2 | m/sec |
| Lubricant oil | SAE 30 | — |
| Oil Supply Pressure | 6 | Kgf/cm² |
| Shaft material | JIS S55C (quenched) | — |
| Shaft roughness | Rmax 1.0–1.5 | μm |
| Shaft hardness | 650 | Hv10 |
| Clearance | 0.055–0.088 | μm |

Evaluation Method: Judgement in which a seizure occurred is effected when bearing back temperature rises over 200° C. or torque rises over 135 kgf · cm.

TABLE 6

Condition of Wear Test

| Item |  | Unit |
|---|---|---|
| 1. Test Machine | Wear tester | — |
| 2. Specific Load | 20 | kg |
| 3. Velocity | 2 | m/sec |
| 4. Friction distance | 200 | m |
| 5. Lubricant oil | 30 | — |
| 6. Mating member (material) | JIS SK3 (quenched), JIS SUJ2 | — |
| Hardness | 700 (SK3), 600 (SUJ2) | Hv10 |
| Roughness | Rmax. 1.0–1.5 | μm |

TABLE 7

Condition of Corrosion Test

| Item |  |
|---|---|
| Method | Immersing in oil |
| Used oil | Shell Rotella oil (already used in 10,000 km running of automobile) |
| Test Temperature | 130° C. |
| Test Time | 1,000 Hrs. |

TABLE 8

| Kind of Specimen | Results of Bending Fatigue Test Load (kgf) | | |
|---|---|---|---|
| | 50 | 30 | 20 |
| ●: No. 6 | 11172 | 113959 | 1117200 |
| ▲: No. 8 | 11310 | 115366 | 1131000 |
| ○: No. 11 | 3931 | 40096 | 393103 |
| ✕: No. 12 | 10000 | 102000 | 1000000 |
| ◊: No. 13 | 8275 | 84414 | 827586 |
| ◆: No. 14 | 9655 | 98483 | 965517 |
| □: No. 15 | 8966 | 91448 | 896600 |

EVALUATION OF THE TEST RESULTS

Table 2 shows mechanical properties of the copper alloys shown in Table 1. Specimens 1 to 10 are the invention alloys while specimens 11 to 15 are conventional alloys. As is apparent from Table 2, the invention alloys have the tensile strength higher than that of the conventional alloys 11 to 15 and also have equal or higher hardness. As is apparent from the results of the fatigue test shown in FIGS. 4 and 5, the fatigue strength of the invention alloys are remarkably superior than those of the conventional alloys, and the invention alloys are greatly improved in strength and toughness.

FIG. 6 shows results of the seizure test of the copper alloys shown in Table 1. As is apparent from FIG. 6, each alloy of the invention is free from seizure at a maximum surface pressure of 150 kg/cm$^2$ and is recognized as a sliding material having an excellent anti-seizure property.

FIG. 7 shows typical results of the wear test of the invention alloys and the conventional alloys. From comparison therebetween, it can be understood that each alloy of the invention has a smaller extent of abrasion and has improved wear resistance in comparison with the conventional alloys.

The wear test was conducted by a wet method using a lubricant oil, and a quenched sample of JIS SK3 and a sample of JIS SUJ2 were used as mating members.

With respect to the results of the corrosion test, as well, the invention alloys are superior than the conventional alloys, as shown in FIG. 8.

As will be apparent from the above, the copper-based alloys of the invention are superior than the conventional alloys in anti-seizure property, wear resistance, corrosion resistance and the fitness to the mating member and also have improved mechanical properties, e.g., a high strength and high toughness. Specifically, the invention alloys have the improved wear resistance and the anti-seizure properties under a high-speed, high-load condition and therefore are excellent in performance when used as a sliding member in various machines to which severer operating conditions, e.g., those of increasing the output, speed and load, are now required. The invention alloys can be suitably applied to such severe conditions.

What is claimed is:

1. A wear-resistant copper alloy having a high strength and high toughness comprising, by weight, 1.2 to 8.5% Mn, 0.3 to 2.5% Si, 3.0 to 8.0% Al, 20 to 40% Zn, and the balance of Cu and unavoidable impurities, said alloy further comprising 0.05 to 1.5% by weight of Te for an improvement in anti-seizure property.

2. A wear-resistant copper alloy according to claim 1 further comprising 0.5 to 3% by weight of Ni.

3. A wear-resistant copper alloy according to claim 1 further comprising 0.5 to 13% by weight of Pb to have a self-lubricating property.

4. A wear-resistant copper alloy according to claim 2 further comprising 0.5 to 13% by weight of Pb to have a self-lubricating property.

5. A wear-resistant copper alloy having a high strength and high toughness comprising, by weight, 1.2 to 8.5% Mn, 0.3 to 2.5% Si, 3.0 to 8.0% Al, 20 to 40% Zn, 0.5 to 13% by weight of Pb, and the balance of Cu and unavoidable impurities, said alloy further comprising 0.05 to 1.5% by weight of Te for an improvement in anti-seizure property, further comprising 0.02 to 1.5% by weight of Mg to disperse lead finely and uniformly.

6. A wear-resistant copper alloy having a high strength and high toughness comprising, by weight, 1.2 to 8.5% Mn, 0.3 to 2.5% Si, 3.0 to 8.0% Al, 20 to 40% Zn, 0.5 to 13% by weight of Pb, 0.5 to 3% by weight of Ni, and the balance of Cu and unavoidable impurities, said alloy further comprising 0.05 to 1.5% by weight of Te for an improvement in anti-seizure property, further comprising 0.02 to 1.5% by weight of Mg to disperse lead finely and uniformly.

* * * * *